United States Patent
Kuzma

[11] Patent Number: 5,889,950
[45] Date of Patent: Mar. 30, 1999

[54] METHOD AND APPARATUS FOR DISTRIBUTION OF BROADCAST DATA

[75] Inventor: Andrew Kuzma, Portland, Oreg.

[73] Assignee: INTEL Corporation, Santa Clara, Calif.

[21] Appl. No.: 771,709

[22] Filed: Dec. 20, 1996

[51] Int. Cl.⁶ .................................................. G06F 13/00
[52] U.S. Cl. .............................. 395/200.48; 395/200.32; 395/200.49; 707/4; 707/513; 348/6; 348/461
[58] Field of Search ................ 395/200.48, 200.32, 395/200.49; 348/461, 6; 707/513, 4

[56] References Cited

U.S. PATENT DOCUMENTS

| | | | |
|---|---|---|---|
| 5,559,548 | 9/1996 | Davis et al. | 348/6 |
| 5,572,643 | 11/1996 | Judson | 395/200.48 |
| 5,617,565 | 4/1997 | Augenbraun et al. | 707/4 |
| 5,619,274 | 4/1997 | Roop et al. | 348/461 |
| 5,745,909 | 4/1998 | Perman et al. | 707/513 |
| 5,774,664 | 6/1998 | Hidary et al. | 395/200.48 |

OTHER PUBLICATIONS (PC Magazine, vol. 15, No. 3, p. 34—Sebastian Rupley) "Browsable searchable TV: TV shows could be the next wave in Web content", Feb. 6, 1996.

(IEEE Transactions on Consumer Electronics, vol. 42, No. 3) "Using IDVS and VBI for Interactive Television", Hamid Qayyum, Aug. 8, 1996.

*Primary Examiner*—Parshotam S. Lall
*Assistant Examiner*—Philip B. Tran
*Attorney, Agent, or Firm*—Blakely, Sokoloff, Taylor & Zafman LLP

[57] ABSTRACT

A method for distributing broadcast data is disclosed. A first plurality of data relating to a television program is listed on a script. A second plurality of data relating to a web page is listed on the script. The script is formatted into HyperText Markup Language (HTML) format. The script is stored onto a public server.

8 Claims, 6 Drawing Sheets

METHOD AND APPARATUS FOR DISTRIBUTION OF BROADCAST DATA

FIELD OF THE INVENTION

The present invention pertains to the field of television and the transmission of (non-television) associated information accompanying television signals. More specifically, the present invention relates to a method and apparatus for scripting broadcast data relating to television programs and web pages.

BACKGROUND OF THE INVENTION

Television programs follow a time-based script; i.e., an interval of program content followed by an interval of commercial (non-program) content. The program and non-program content are further subdivided into smaller intervals, such as thirty-second commercials and fifteen second commercials, for example. Some program content cannot be pre-arranged, such as live news coverage and live sporting events. However, these are exceptions to most television broadcasts, and even live sporting events use some "triggers" to allow for intervals of non-program content, and within these intervals the relative relationships between national and local content are known by prior agreement.

The vast majority of programming is well structured in that an absolute time for various content intervals are known by prior agreement; for example, a game show has well-known intervals of the game interspersed with commercial intervals. The national network source provides an absolute time reference that is used by the local affiliates to coordinate their local production with the national programming.

Today, local affiliate networks who receive broadcast television material from a national source can insert local advertisements and programming at certain time slots during re-transmission of the broadcast material. The selected time slots were portions in the broadcast material where the national source inserted a "video black" background which is easy to find. Thus, the local affiliates are able to select the time slots where they can insert local advertisement and programming. Further, for pre-recorded programs, the local affiliates can pre-sell time because they know which time slots are apportioned to local content.

Television networks have begun displaying non-television associated information with associated television programs. While associated information might be displayed on a television monitor, it is not television information because it does not represent motion images per a broadcast standard such as the North America Television Standard Committee (NATSC) recommended format.

Transmitting associated information can be achieved through many methods, such as alternate networks (e.g., telephones), alternate broadcast carriers (e.g., radio), or within the television signal itself. One method to send the associated data within the television signal itself is to use the Vertical Blanking Interval (VBI), a time interval during which no active video information is being sent. Television networks have begun providing viewers with associated information to augment their television programming through Hypertext Markup Language (HTML) Web pages. Television networks are encoding HTML web pages into open data channels of broadcast media. For example, the Vertical Blanking Interval (VBI) of television broadcast signals are used by some networks to encode HTML web pages relating to specific programming. This allows the television network to deliver web pages containing relevant information relating to a news report, television show, or advertisements directly with the news report, television show, or advertisement. Intel IntercastTm is an example of such a system.

Viewers receiving the television broadcast from their personal computers demodulate the encoded signals in the VBI and view the HTML web page with an Internet browser. The viewers may connect to hyperlinks on the broadcasted web pages to obtain additional information by using an Internet service provider to access other available links. The HTML web pages broadcasted by the television networks allow viewers to combine the interactivity of a computer, the programming of television, and the worldwide information resources of the Internet.

It should be recognized that with today's methods for determining when local advertising can be inserted to the national content provides an important revenue means to the local affiliate. Local affiliates would like to determine when a national source is broadcasting a web page, how many web pages are being broadcast at a time, and what the content of the web pages are in advance for its own marketing and editing purposes. Without some method to control the associated information, the local affiliate has no incentive to pass the associated information nor to contribute local content to it, thus limiting the acceptance and widespread use of associated information.

Thus, a method and apparatus for scripting broadcast data relating to television programs and web pages is needed.

SUMMARY OF THE INVENTION

A method for distributing broadcast data is disclosed. A first plurality of data relating to a television program is listed on a script. A second plurality of data relating to a web page is listed on the script. The script is formatted into HyperText Transfer Protocol (HTTML) format. The script is stored onto a server.

A first method for scheduling broadcast of television programs and web pages is disclosed. A HTML script containing broadcast data relating to the television programs and the web pages is received. The HTML script is edited. The HTML script is executed.

A second method for scheduling broadcast of television programs and web pages is disclosed. A script formatted in HTML containing information relating to television programs and web pages to be broadcasted from a first location is received. A set of television programs and web pages to be re-transmitted at a second location is determined from the information in the script.

A script formatted in HTML is disclosed. The script comprises a first plurality of data relating to a television program. The script further comprises a second plurality of data relating to a web page.

BRIEF DESCRIPTION OF THE DRAWINGS

The present invention is illustrated by way of example and not by way of limitation in the figures of the accompanying drawings, in which like references indicate similar elements and in which.

DETAILED DESCRIPTION

Figure 1:
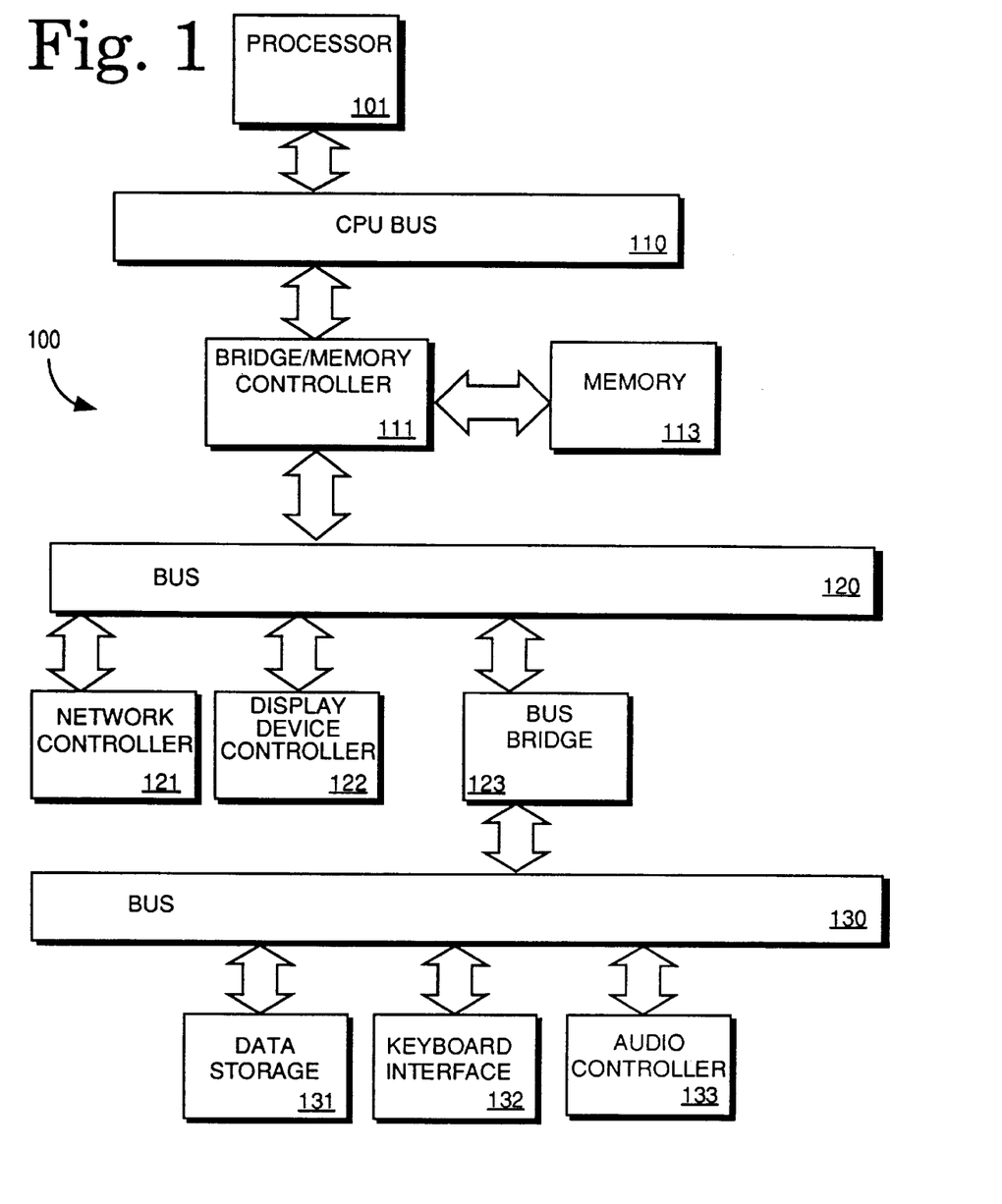
FIG. 1 illustrates a block diagram of a computer system implementing an embodiment of the present invention.

FIG. 1 illustrates a block diagram of a computer system implementing an embodiment of the present invention. The computer system 100 comprises a processor 101 that processes digital data. The processor 101 can be a complex instruction set computing (CISC) microprocessor, a reduced instruction set computing (RISC) microprocessor, a very long instruction word (VLIW) microprocessor, a processor implementing a combination of instruction sets, or other processor device. The processor 101 is coupled to a CPU bus 110 which transmits signals between the processor 101 and other components in the computer system 100.

A memory 113 comprises a dynamic random access memory (DRAM) device, a static random access memory (SRAM) device, or other memory devices. The memory 113 stores information or other intermediate data during execution by the processor 101. A bridge memory controller 111 is coupled to the CPU bus 110 and the memory 113. The bridge memory controller 111 directs data traffic between the processor 101, the memory 113, and other components in the computer system 100 and bridges signals from these components to a high speed I/O bus 120.

The high speed 110 bus 120 supports peripherals operating at high data throughput rates. The bus 120 can be a single bus or a combination of multiple buses. As an example, the bus 120 can comprise a Peripheral Components Interconnect (PCI) bus, a Personal Computer Memory Card International Association (PCMCIA) bus, or other buses. The bus 120 provides communication links between components in the computer system 100 A network controller 121 links a network of computers together and provides communication among the machines. A display device controller 122 is coupled to the high speed I/O bus 120. The display device controller 122 allows coupling of a display device to the computer system and acts as an interface between the display device and the computer system 100. The display device receives information and data from the processor 101 through the display device controller 122 and displays the information and data to the user of the computer system 100. A bus bridge 123 couples the high speed I/O bus 120 to I/O bus 130. The bus bridge 123 comprises a translator to bridge signals between the high speed I/O bus 120 and the I/O bus 130.

The I/O bus 130 is used for communicating information between peripheral device which operate at lower throughput rates. The I/O bus 130 can be a single bus or a combination of multiple buses. As an example, the bus 130 can comprise an Industry Standard Architecture (ISA) bus, an Extended Industry Standard Architecture (EISA) bus or a Micro Channel Architecture (MCA) bus. The bus 130 provides communication links between components in the computer system 100. A keyboard interface 132 can be a keyboard controller or other keyboard interface. The keyboard interface 132 can be a dedicated device or can reside in another device such as a bus controller or other controller. The keyboard interface 132 allows coupling of a keyboard to the computer system and transmits signals from a keyboard to the computer system 100. A data storage device 131 can be a hard disk drive, a floppy disk drive, a CD-ROM device, a flash memory device or other mass storage device. An audio controller 133 operates to coordinating the recording and playing of sounds is also coupled to I/O bus 130.

According to one embodiment of the present invention, computer system 100 is used for distributing broadcast data. According to one embodiment, distributing broadcast data is performed by computer system 100 in response to the processor 101 executing sequences of instructions contained in the memory 113. Such instructions may be read into the memory 113 from other computer-readable mediums such as data storage device 131. Execution of the sequences of instructions contained in the memory 113 causes the processor to distribute broadcast data, as will be described hereafter. In alternative embodiments, hard-wired circuitry may be used in place of or in combination with software instructions to implement the present invention. Thus, the present invention is not limited to any specific combination of hardware circuitry and software.

According to a second embodiment of the present invention, computer system 100 is used for scheduling broadcast of television programs and web pages. According to one embodiment, scheduling broadcast of television programs and web pages is performed by computer system 100 in response to the processor 101 executing sequences of instructions contained in the memory 113. Such instructions may be read into the memory 113 from other computer-readable mediums such as data storage device 131. Execution of the sequences of instructions contained in the memory 113 causes the processor to schedule broadcast of television programs and web pages, as will be described hereafter. In alternative embodiments, hard-wired circuitry may be used in place of or in combination with software instructions to implement the present invention. Thus, the present invention is not limited to any specific combination of hardware circuitry and software.

Figure 2:
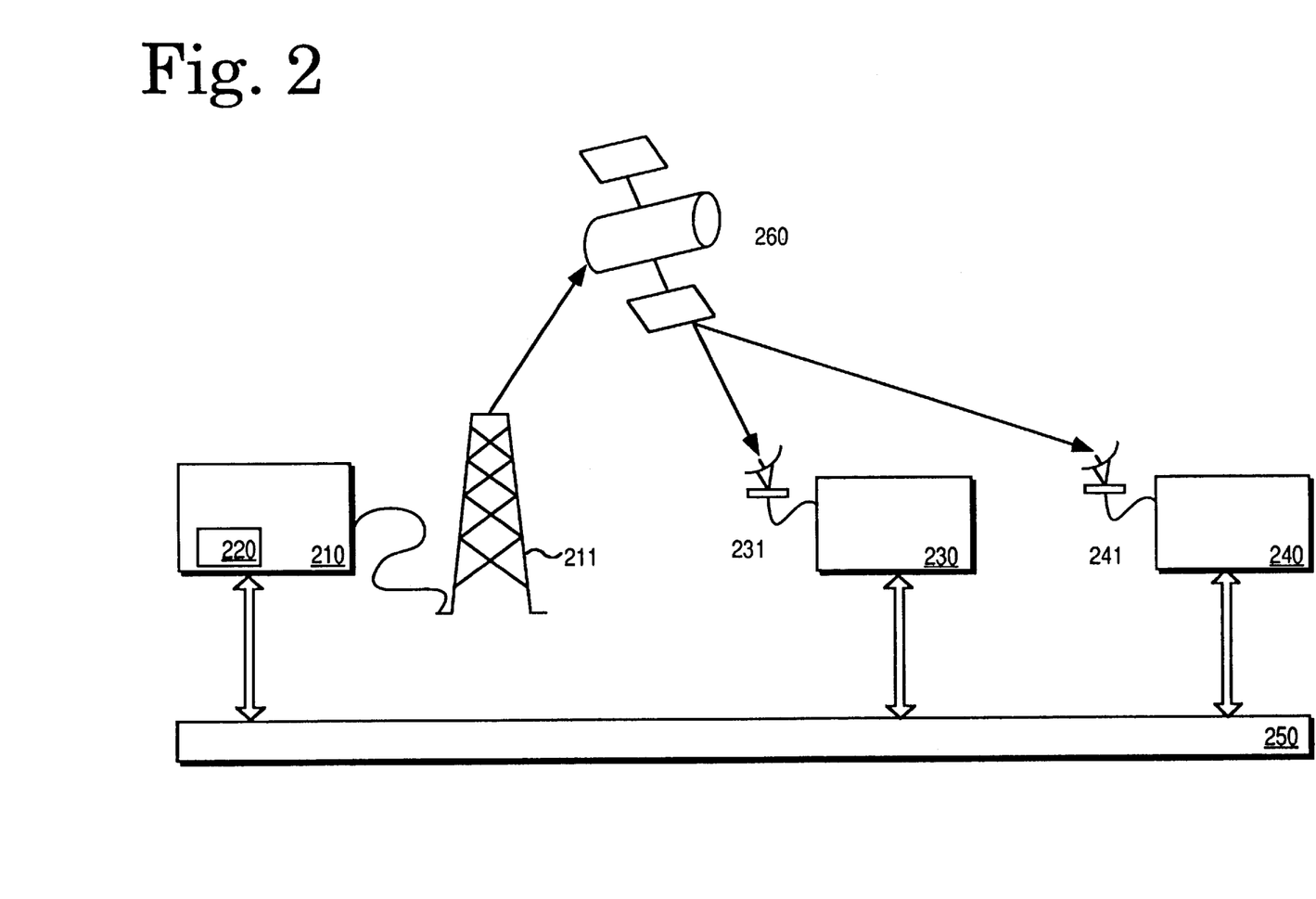
FIG. 2 illustrates how a script containing broadcast data is delivered according to an embodiment of the present invention.

FIG. 2 illustrates how a script containing broadcast data is delivered according to an embodiment of the present invention. Block 210 represents a first location where broadcast material is transmitted. According to one embodiment of the present invention, the broadcast material includes television programs and web pages. The television programs may be an actual television show or a television advertisement. The first location 210 may be a national source where a national feed of national broadcast material originates. The broadcast material is transmitted from a transmitter 211 at the site of the first location 210 to a satellite 260 that directs the broadcast material to a plurality of locations where the broadcast material will be retransmitted.

Block 230 represents a second location where the broadcast material is transmitted to and where the broadcast material is retransmitted. The second location 230 may be the location of a local affiliate network of the national source 210. The second location 230 receives signals containing the broadcast material from a receiver 231. Block 240 represents a third location where the broadcast material is transmitted to and where the broadcast material is re-transmitted. The third location 240 may be the location another local affiliate network of the national source 210. The third location 240 receives signals containing the broadcast material from a receiver 241.

The first location 210 includes a scripting unit 220. A script that contains broadcast data relating to the broadcast material transmitted by the first location 210 is formatted in HTML and is stored on the scripting unit 220. In one embodiment of the present invention, the scripting unit 220 is a server connected to the Internet 250 and is configured similarly to the computer system 100 illustrated in FIG. 1. The script is accessible by the second and third locations 230 and 240 via the Internet 250. The script may be viewed by the second and third locations 230 and 240 by using a computer system with an Internet browser.

Figure 3:
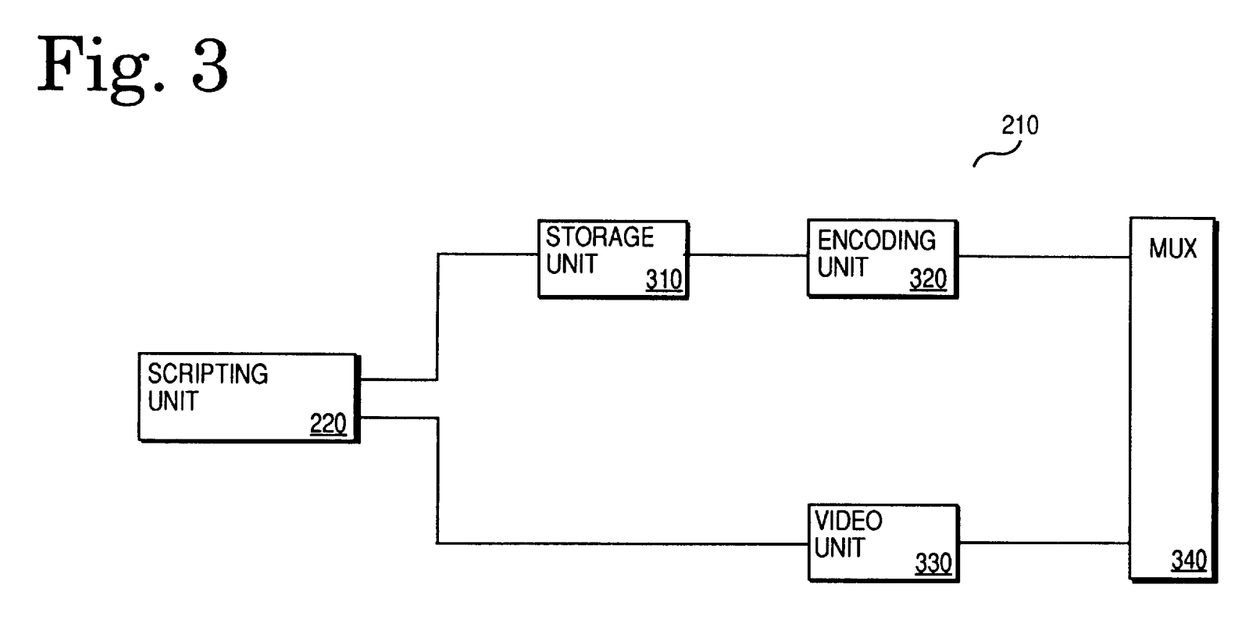
FIG. 3 illustrates a block diagram of components inside a first location.

FIG. 3 illustrates one embodiment of the first location 210 according to the present invention. The first location 210 includes a scripting unit 220 that stores a HAL script containing broadcast data relating to the broadcast material transmitted by the first location 210. The scripting unit 220 also operates to coordinate the encoding of a HTML web pages with a television programming that it is scheduled to be broadcasted with the web page by using the HTML script. The HTML script is a viewer readable broadcast schedule and an executable program that directs the scripting unit 220 to coordinate the encoding of HTML web pages with television programs.

Storage unit 310 is coupled to the scripting unit 220. The storage unit 310 operates to store data files containing HTML web pages that are to be transmitted by the first location 210. The scripting unit 220 accesses the storage unit 310 to locate an HTML web page scheduled on the HTML script to be broadcasted at a given time.

Encoder unit 320 is coupled to the storage unit 310. The encoder unit 320 operates to encode HTML web pages from the storage unit 310 into a format compatible with the broadcasting signals of the first location 210. In one embodiment of the present invention, the first location 210 uses analog broadcasting signals and the encoder unit 320 encodes web pages into VBI. In an alternate embodiment of the present invention, the first location 210 uses digital broadcasting signals and the encoder unit 320 encodes web pages into a separate data channel. The encoder unit 320 encodes HTML web pages that are scheduled on the HTML script to be broadcasted at a given time as directed by the scripting unit 210.

Video unit 330 is coupled to the scripting unit 220. The video unit 330 operates to store television programs that are to be transmitted by the first location 210. The scripting unit 220 accesses the video unit 310 to locate a television program scheduled on the HTML script to be broadcasted at the given time with the web page. The scripting unit 220 sends the television program and the encoded HTML web pages into a multiplexer unit 340 where the encoded HTML web page is encoded with the broadcast signals of the television program.

In another embodiment of the present invention, the scripting unit 220 may access other servers via the Internet 250 to obtain HTML web pages that are not stored in storage unit 310. In still another embodiment of the present invention, the scripting unit 220 may access other servers via the Internet 250 to obtain files containing television programs that are not stored in the video unit 330. The scripting unit 220, storage unit 310, encoder unit 320, video unit 330, and multiplexer unit 340 may be implemented by any known circuitry.

Figure 4:
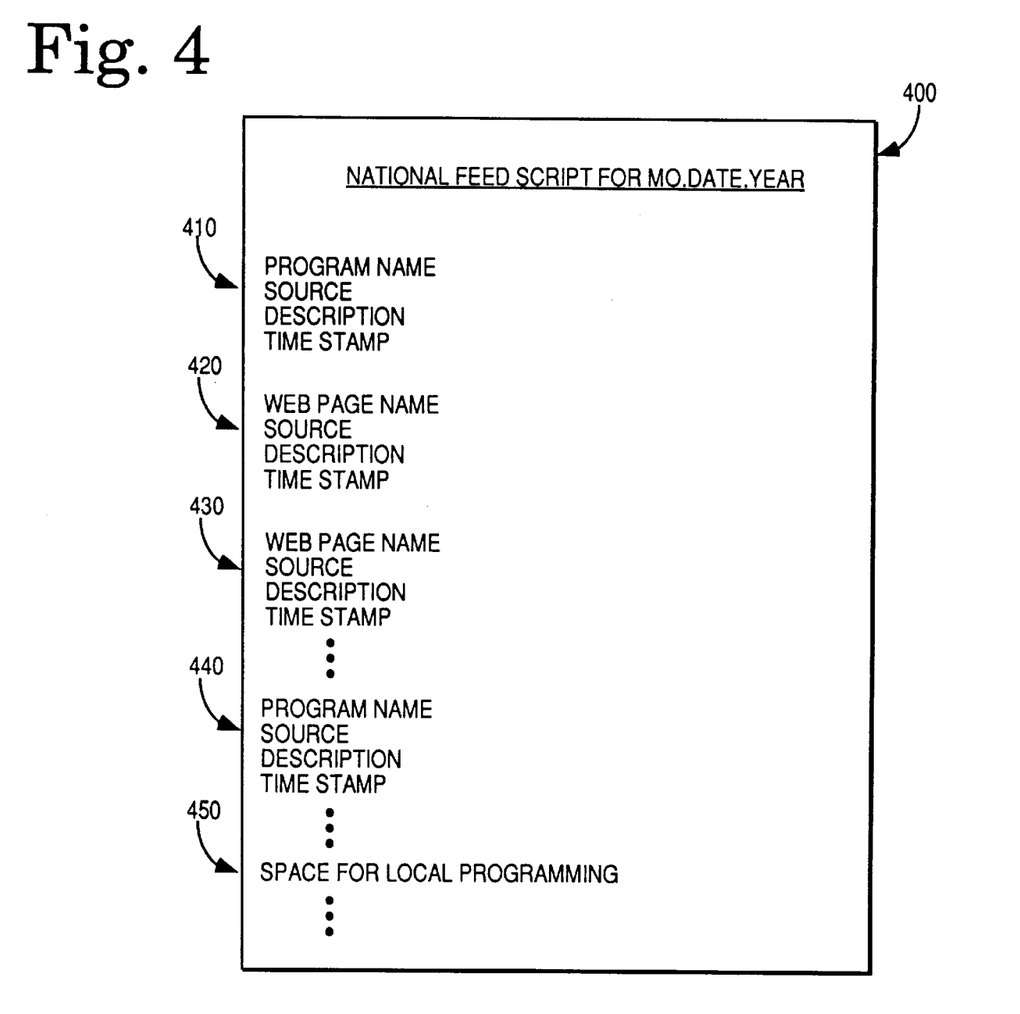
FIG. 4 illustrates the structure of a script according to an embodiment of the present invention.

FIG. 4 illustrates the structure of a script according to an embodiment of the present invention. The script 400 contains a plurality of entries 410–440 listing information about television programs and web pages. The information about the television programs or web pages include a name, source, description, and time stamp of the programs or web pages. The script 400 also contains an entry 450 indicating when, during a national broadcast, local programming such as a local television show or a local advertisement may be inserted.

The source information of the program or web page may be a location of where the program or web page is stored. A Uniform Resource Locator (URL) may be used to identify the location of a server storing a file containing a program or web page. An Internet address may be used to identify a location of a computer system storing a file containing a program or web page. A local affiliate may use the source information to access and preview a program or web page. A local affiliate may also use the source information to download a program or web page when a national source is unable to transmit the program or web page via broadcast signals or when it is more economically feasible to download the program or web page using the Internet. The source information may be encoded in a hyperlink to automate connection with a server.

The description information describes the content of the program or web page. The description information may provide a rating for the program or web page. A local affiliate may use the description information to decide whether or not the program or web page is appropriate for its local audience.

The time stamp provides a time reference as to when the program or web page is to be broadcasted. A local affiliate may use the time stamp to determine when it may insert local programming. The local programming may include local television shows or local advertisements. A local network may also use the time stamp to determine when it may insert its own web pages into the existing national programming or into space allocated for local programming.

By making broadcast data available to re-transmitters of broadcast material through a HTML script on a server, local affiliates or other parties wishing to access the broadcast data may do so by using one of several Internet browsers. Local affiliates or other parties wishing to access the broadcast data need not be familiar with the computer system or database of the national source. Local affiliates with a configuration similar to that of the first source 210 could directly edit a version of the HTML script and use the edited version of the HTML script to coordinate the encoding of additional HTML web pages with television programs.

The present invention allows the national source to indicate time spaces available for local advertising. By making available information relating to when and how long the time slots for local advertising are, the selling of local advertising space is made easier. The present invention allows local affiliates to use the HTML script to determine whether channels in the broadcast signals, such as VBI lines, are available to insert additional web pages during re-transmission of the broadcast material. The present invention also allows local affiliates to use the HTML script to determine when and how to edit the broadcast material received by the national source. Editing may involve adding video programs or web pages at available time slots or deleting existing programming material and substituting the open time slots with video programs or web pages.

Figure 5:
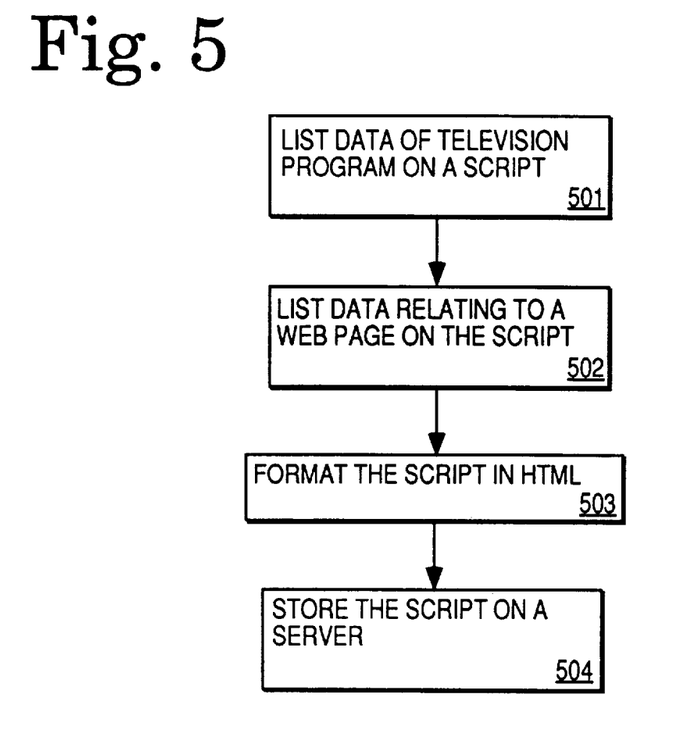
FIG. 5 is a flow chart illustrating a method of distributing broadcast data according to an embodiment of the present invention.

FIG. 5 is a flow chart illustrating a method of distributing broadcast data according to an embodiment of the present invention. At step 501, a first plurality of data relating to a television program is listed on a script. In one embodiment of the present invention, the first plurality of data may include a description of the television program, a source of where the television program is stored, and a time stamp providing a point of reference of when the television program will be broadcasted.

At step 502, a second plurality of data relating to a web page is listed on the script. In one embodiment of the present invention, the second plurality of data may include a description of the web page, a source of where the web page is stored, and a time stamp providing a point of reference of when the web page will be broadcasted.

At step 503, the script is formatted in HTML. In one embodiment of the present invention, formatting the script includes creating a body to store text and anchoring a link that connects the script to a location containing additional information.

At step 504, the HTML formatted script is stored onto a server. In one embodiment of the present invention, storing the script onto a server involves saving the script as a file accessible to users on the Internet.

Figure 6:
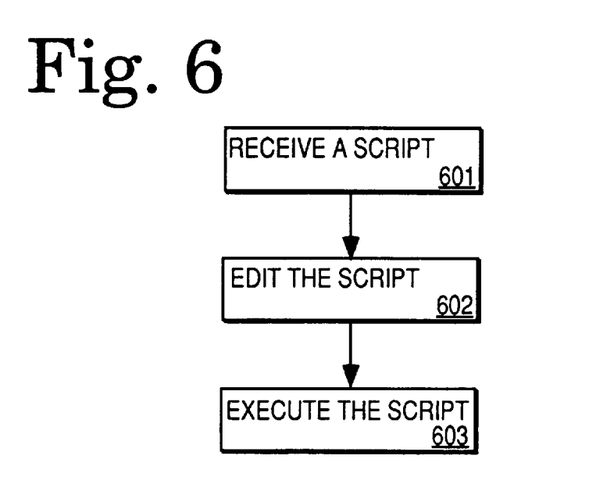
FIG. 6 is a flow chart illustrating a method of scheduling broadcast of television programs and web pages according to an embodiment of the present invention.

FIG. 6 is a flow chart illustrating a method of scheduling the broadcast of television programs and web pages according to an embodiment of the present invention. At step 601, an HTML script containing broadcast data relating to the television programs and the web pages is received. The script is received via the Internet by using an Internet browser to access a server storing the script. In one embodiment of the present invention, the information relating to the television programs and web pages includes a name, description, source, and time stamp of broadcast of the television programs and web pages.

At step 602, the HTML script is edited. In one embodiment of the present invention, the step of editing comprises inserting information relating to an additional web page to be broadcasted into the HTML script. The information includes source information indicating where the additional web page is located and a time stamp indicating when the additional web page is to be broadcasted. According to an alternate embodiment of the present invention, the step of editing comprises deleting broadcast data on the HTML script relating to a web page to be removed from broadcast.

At step 603, the edited HTML script is executed. The step of executing the HTML script comprises the step of encoding HTML web pages with television programs that the web pages are scheduled on the HTML script to be broadcasted with. In one embodiment of the present invention, a web page having a first time stamp at a first time is encoded with a television program having a second time stamp at the first time.

Figure 7:
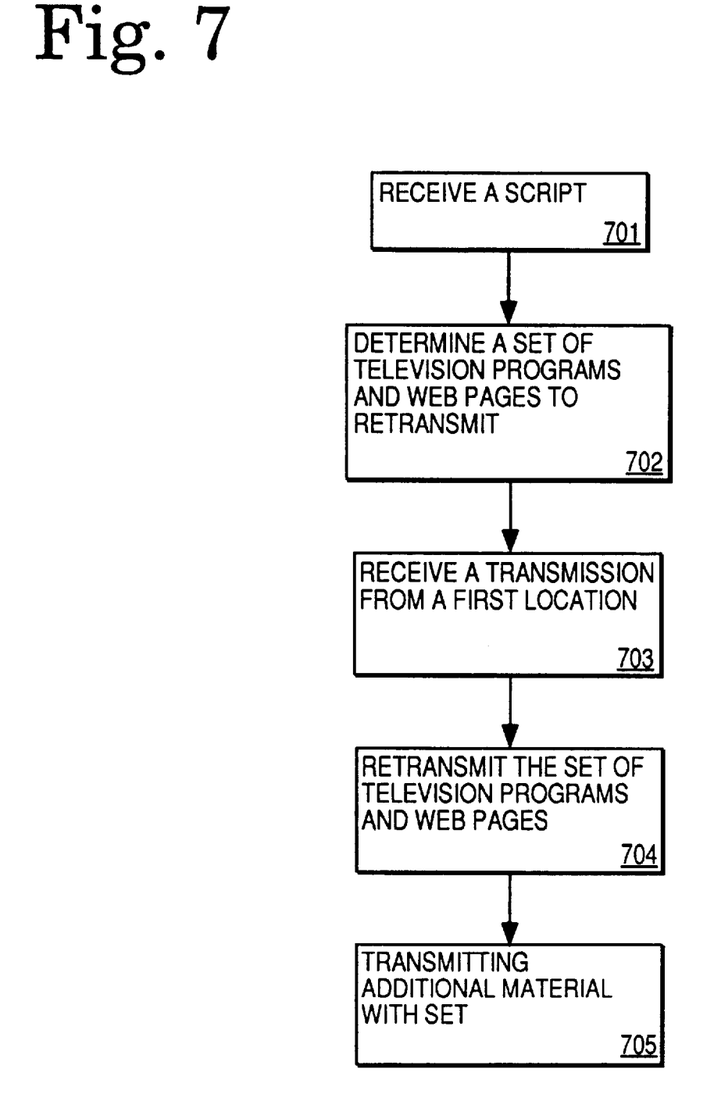
FIG. 7 is a flow chart illustrating a method of scheduling broadcast of television programs and web pages according to an alternate embodiment of the present invention.

FIG. 7 is a flow chart illustrating a method of scheduling broadcast of television programs and web pages according to an alternate embodiment of the present invention. At step 701, a script formatted in HTML is received. The script is received via the Internet by using an Internet browser to access a public server at a first location storing the script. The script includes information relating to television programs and web pages that will be broadcasted from the first location. In one embodiment of the present invention, the information relating to the television programs and web pages includes a name, description, source, and time stamp of broadcast of the television programs and web pages.

At step 702, a set of television programs and web pages to be re-transmitted at a second location is determined using information from the script In one embodiment of the present invention, the determination is made by analyzing the description information in the script for content that is suitable or not suitable for a particular audience. In another embodiment of the present invention, the determination is made by analyzing the time stamp information in the script for a time of broadcast that is agreeable with an agenda of the second location.

At step 703, a transmission of the television programs and web pages is received from the first location. The transmission is recorded at the second location.

At step 704, the set of television programs and web pages are re-transmitted from the second location.

At step 705, additional material is transmitted with the re-transmission of the set of television programs and web pages. In one embodiment of the present invention, the additional material comprises additional web pages that are transmitted at selected time segments of the re-transmission of the set. In another embodiment of the present invention, local advertisements are transmitted at selected time segments of the re-transmission of the set. In still another embodiment of the present invention, the additional material comprises a new television program that is transmitted at selected time segments of the re-transmission of the set. The time segments are determined based on time stamp information in the script.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than an restrictive sense.

What is claimed is:

1. A method for scheduling broadcast of television programs and web pages, comprising:
    receiving a HyperText Markup Language (HTML) script containing broadcast data relating to the television programs and the web pages;
    editing the HTML script; and
    executing the HTML script by encoding a first HTML web page having a first time stamp at a first time with a first television program having a second time stamp at the first time.

2. The method of claim 1, wherein the step of receiving the HTML script comprises the step of downloading the HTML script from a server at a first location.

3. The method of claim 1, wherein the step of editing the HTML script comprises the step of inserting additional broadcast data relating to an additional web page to be broadcasted.

4. The method of claim 1, wherein the step of editing the HTML script comprises the step of deleting broadcast data relating to a web page to be removed from broadcast.

5. A computer-readable medium having stored thereon a sequence of instructions, the sequence of instructions including instructions which, when executed by a processor, causes the processor to perform the steps of:
    receiving a HyperText Markup Language (HTML) script containing broadcast data relating to the television programs and the web pages;
    editing the HTML script; and
    executing the HTML script by encoding a first HTML web page having a first time stamp at a first time with a first television program having a second time stamp at the first time.

6. The computer-readable medium of claim 5, wherein the step of receiving the HTML script comprises the step of downloading the HTML script from a server at a first location.

7. The computer-readable medium of claim 5, wherein the step of editing the HTML script comprises the step of inserting additional broadcast data relating to an additional web page to be broadcasted.

8. The computer-readable medium of claim 5, wherein the step of editing the HTML script comprises the step of deleting broadcast data relating to a web page to be removed from broadcast.

* * * * *

UNITED STATES PATENT AND TRADEMARK OFFICE
CERTIFICATE OF CORRECTION

PATENT NO. : 5,889,950
DATED : March 30, 1999
INVENTOR(S) : Kuzma

It is certified that error appears in the above-identified patent and that said Letters Patent is hereby corrected as shown below:

Column 2,
Line 36, delete "HTTML" and insert -- HTML --.

Column 3,
Line 36, delete "110" and insert -- I/O --.

Column 4,
Lines 53 and 56, delete "retransmitted" and insert -- re-transmitted --.

Column 5,
Line 12, delete "HAL" and insert -- HTML --.

Signed and Sealed this

Twenty-fifth Day of November, 2003

JAMES E. ROGAN
*Director of the United States Patent and Trademark Office*